United States Patent
Longin

(10) Patent No.: US 10,539,680 B2
(45) Date of Patent: Jan. 21, 2020

(54) METHOD AND SYSTEM FOR DETERMINING THE ACCURACY OF A SATELLITE-BASED NAVIGATION SYSTEM

(71) Applicant: FORD GLOBAL TECHNOLOGIES, LLC, Dearborn, MI (US)

(72) Inventor: David Longin, Herent (BE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/458,517

(22) Filed: Mar. 14, 2017

(65) Prior Publication Data

US 2017/0285179 A1    Oct. 5, 2017

(30) Foreign Application Priority Data

Mar. 31, 2016    (DE) .................. 10 2016 205 277

(51) Int. Cl.
    *G01S 19/45*    (2010.01)
(52) U.S. Cl.
    CPC .................... *G01S 19/45* (2013.01)
(58) Field of Classification Search
    CPC ..................................... G01S 19/45
    See application file for complete search history.

(56) References Cited

U.S. PATENT DOCUMENTS

| | | | |
|---|---|---|---|
| 7,739,034 B2 | 6/2010 | Farwell | |
| 7,797,132 B1 * | 9/2010 | Lele | G01C 25/00 |
| | | | 702/181 |
| 8,044,859 B2 | 10/2011 | Lommen et al. | |
| 2006/0106533 A1 | 5/2006 | Hirokawa | |
| 2008/0262718 A1 * | 10/2008 | Farwell | G05D 1/0234 |
| | | | 701/445 |
| 2012/0013977 A1 | 1/2012 | Jelusic et al. | |

(Continued)

FOREIGN PATENT DOCUMENTS

DE    102013016435 A1    4/2015

OTHER PUBLICATIONS

German Search Report dated Mar. 9, 2017 for German Application No. 102016205277.2, 6 pgs.

(Continued)

*Primary Examiner* — Imran K Mustafa
(74) *Attorney, Agent, or Firm* — Brooks Kushman P.C.; Frank MacKenzie

(57) ABSTRACT

The disclosure relates to a method for determining the accuracy of a satellite-based navigation system for a vehicle during operation on a test route. The method includes providing a light beam propagating essentially perpendicularly to the direction of travel along the test route at each of two selected measurement points on the test route. Upon detection of the light beams impacting the vehicle perpendicularly to the direction of travel, a detection of the position and the direction of travel measured by a receiver of the satellite-based navigation system is triggered by means of an optical triggering device fastened on the vehicle. Finally, an accuracy of the satellite-based navigation system is determined on the basis of the two detected positions and directions of travel and position coordinates of the two selected measurement points. The disclosure also relates to a corresponding system for determining the accuracy of a satellite-based navigation system.

15 Claims, 2 Drawing Sheets

(56) References Cited

U.S. PATENT DOCUMENTS

| | | |
|---|---|---|
| 2012/0139775 A1 | 6/2012 | Popovic |
| 2012/0016954 A1 | 7/2012 | Singh |
| 2012/0169541 A1 | 7/2012 | Singh |
| 2014/0025337 A1 | 1/2014 | Blount et al. |
| 2014/0046587 A1* | 2/2014 | Rintanen ............... G01S 7/4808 701/469 |
| 2014/0253372 A1 | 9/2014 | Davis et al. |

OTHER PUBLICATIONS

Stahli, J. et al., "Precise position determination with Low-cost GPS and postprocessing", Feb. 2013, 29 pgs., Machine Translation.

* cited by examiner

METHOD AND SYSTEM FOR DETERMINING THE ACCURACY OF A SATELLITE-BASED NAVIGATION SYSTEM

CROSS-REFERENCE TO RELATED APPLICATIONS

This application claims foreign priority benefits under 35 U.S.C. § 119(a)-(d) to DE Application 10 2016 205 277.2 filed Mar. 31, 2016, which is hereby incorporated by reference in its entirety.

TECHNICAL FIELD

The disclosure relates to a method and a system for determining the accuracy of a satellite-based navigation system for a vehicle during operation on a test route.

BACKGROUND

With the aid of a satellite-based navigation system, the position of a vehicle can be determined with respect to a geocentric, three-dimensional coordinate system, such as, for example, length, width and height. In the case of such a system, which is also referred to as GNSS (Global Navigation Satellite System), a GNSS receiver in the vehicle receives GNSS signals from multiple satellites. In principle, the GNSS receiver determines—on the basis of orbital data and transmission time stamps contained in the signals—the transit time of the signals and, therefore, the distance to each satellite that was received. With the aid of the known satellite-based navigation systems, such as, for example, GPS (Global Positioning System) or GLONASS (GLObal NAvigation Satellite System), a horizontal position determination having an accuracy of approximately 10 meters can be achieved in the civilian sector. Nowadays, the accuracy can be increased to up to 2 centimeters (cm) by way of receiving and processing additional correction data. Such correction data are provided by different services. A transmission of the correction values takes place, for example, via cellular telephone or satellites.

Highly accurate satellite-based navigation systems are used, for example, for test purposes in test vehicles. In this case, changes in a system set-up or a configuration can quickly result in inaccuracies in a position determination. In addition, in modular navigation systems for installation into and removal from different test vehicles, a determination of the accuracy or errors in the position determination is necessary with each use, due to the highly precise absolute position determination. Thus there is a need for a rapid and highly precise measurement of the accuracy of a navigation system used for a traveling vehicle, which is carried out as simply as possible.

Known methods and systems are poorly suited for such a measurement. U.S. Pat. No. 7,797,132 B2, for example, describes a method and a system for testing the accuracy of a GPS navigation system for mobile communication devices, in which received GPS signals are initially evaluated and recorded during travel along a test route. The recorded GPS data are used by a GPS simulator in a laboratory for generating corresponding GPS signals. A stationary communication device located in the laboratory receives the simulated GPS signals and determines, therefrom, corresponding positions. The determined positions can be compared with the real route or with the position data determined by other communication devices in order to determine the performance of the navigation system.

One problem addressed by the present disclosure is that of providing a method and a system for determining the accuracy of a satellite-based navigation system, wherein the aforementioned disadvantages are avoided or are at least reduced and, in particular, a rapid execution of an accuracy determination with high precision and with as little effort as possible is made possible during an operation of a vehicle on a test route.

This problem is solved by a method and by a system for determining the accuracy of a satellite-based navigation system for a vehicle during operation on a test route.

SUMMARY

In a method according to the disclosure for determining the accuracy of a satellite-based navigation system for a vehicle during operation on a test route, a light beam propagating essentially perpendicularly to the direction of travel along the test route is provided at each of two selected measurement points on the test route. The test route is, for example, a road on testing grounds. A selection of the measurement points takes place only at locations at which the directions of travel or particular sections of the test route are not parallel to each other at the measurement points. In addition, measurement points, in particular, can be selected whose positions are already known with sufficient accuracy. Alternatively, in one embodiment of the method, a measurement of selected measurement points for determining the horizontal coordinates of the measurement points is provided. In order to provide the light beam oriented perpendicularly to the direction of travel, a suitably designed, optical device is disposed, for example, at two selected measurement points.

With the aid of an optical triggering device fastened on the vehicle, the light beams impacting the vehicle perpendicularly to the direction of travel are detected during an operation of the vehicle on the test route. For this purpose, the optical triggering device preferably includes a suitable detector, which detects the light coming from the measurement points. Upon detection of such a light beam, a detection of the position measured by a receiver of the satellite-based navigation system, and of the direction of travel, is triggered by the optical triggering device. In this case, for example, the measured position is stored in a memory in the vehicle or the measured position is transmitted to an external data processing system.

In addition, the method according to the disclosure includes a determination of an accuracy of the satellite-based navigation system on the basis of the two detected positions and directions of travel and on the basis of the position coordinates of the two selected measurement points. In each detection of a light beam impacting the vehicle perpendicularly to the direction of travel, only the position components in the direction of travel are accurately determined in each case, while the position components in the direction perpendicular to the direction of travel remain undetermined. Therefore, a distance of the optical triggering device from a measured reference point of the navigation system perpendicular to the direction of travel as well as a lateral offset of the vehicle on the test route do not need to be taken into consideration. The determination of the accuracy takes place, for example, by means of a suitably designed data processing system.

With the aid of such a method according to the disclosure, a rapid and highly precise determination of the accuracy of the satellite-based navigation system is made possible. In this case, after the light beams oriented perpendicularly to the direction of travel are provided at the measurement points, all that is necessary is to dispose the optical triggering device on the vehicle. The method can therefore be carried out in many different vehicles, one after the other, in a simple way.

In one advantageous embodiment of the disclosure, the optical triggering device is disposed on the vehicle in a plane perpendicular to the direction of travel, in which the reference point measured by the receiver of the satellite-based navigation system is located. In this case, the optical triggering device is disposed, in particular, with a deviation from the plane, which is less than a maximum accuracy of the position determination of the satellite-based navigation system, i.e., for example, with a deviation of less than 2 cm. Due to this measure, there is no longer a need to account for the distance of the optical triggering device in the direction of travel from the measured point of the navigation system in an accuracy determination.

According to one preferred embodiment of the disclosure, two measurement points on the test route having directions of travel that are essentially perpendicular to one another are selected for providing the light beams propagating along the test route perpendicularly to the direction of travel. As described above, only one position component in the direction of travel is accurately determined in every detection of a light beam impacting the vehicle perpendicularly to the direction of travel. The position components in the direction perpendicular to the direction of travel remain undetermined. With the aid of a consecutively carried-out determination of measured positions of the navigation system in the case of directions of travel oriented perpendicular to each other, an error with respect to the two horizontal directions in the determination of the accuracy of the navigation system is therefore minimized.

According to yet another advantageous embodiment of the disclosure, a light beam directed onto the vehicle perpendicularly to the direction of travel of the vehicle is provided at three or more selected measurement points on the test route. As the number of measured values increases, errors in the determination of the accuracy of the satellite-based navigation system are reduced. According to one embodiment, measurement points are preferably selected in the case of which the direction of travel is not parallel to one of the other measurement points. In a detection of position data measured by the satellite-based navigation system at two measurement points having parallel directions of travel, only one error in one of the two horizontal directions is reduced. In the case of non-parallel directions of travel, however, an effective error minimization with respect to both horizontal coordinates takes place.

According to one embodiment according to the disclosure, a reflector for providing the light beam, which is essentially perpendicular to the direction of travel, by reflection of a light beam emitted from the vehicle is disposed at one of the selected measurement points. A retroreflector, one or more mirrors, or another suitable arrangement of optical elements is/are used, for example, as the reflector. The light beam emitted from the vehicle is generated, for example, by a light source of the optical triggering device. For this purpose, the triggering device can comprise, for example, a laser, one or more LEDs, or a thermal light source. Alternatively, such a light source can also be fastened on the vehicle, in addition to the optical triggering device. According to one embodiment, an adjustment of the light source provided in the vehicle takes place in such a way that a parallel beam of light is emitted as accurately as possible perpendicular to the direction of travel. As a result, if a retroreflector is used, an accurate orientation of the reflector is not necessary, since a retroreflector reflects a light beam back to itself largely independently of the incident angle. A reflector does not require a power supply, has a relatively simple and low-maintenance design, and can be quickly set up at a selected measurement point on the test route.

In addition, a preferred embodiment of the disclosure provides that a light source for providing the light beam, which is essentially perpendicular to the direction of travel, is disposed at one of the selected measurement points. A laser, one or more LEDs, or a thermal light source, for example, is/are used as the light source. In addition, a collimator for generating a parallel beam of light can be disposed at the light source. Preferably, an orientation of the light source takes place in such a way that the generated light beam, which is perpendicular to the direction of travel or perpendicular to the test route, propagates along the test route at the level of the optical triggering device on the vehicle. With the aid of a stationary light source on the edge of the test route, the optical triggering device without a light source can be implemented compactly and with few components.

According to one advantageous embodiment of the disclosure, the determination of the accuracy of the satellite-based navigation system includes a comparison of an intersection point of two light beams, which has been calculated from the measured positions and directions of travel, with an intersection point of the light beams, which has been established by the selected measurement points for providing these light beams. In other words, for every selected measurement point, exactly one measured straight line can be formed perpendicular to the direction of travel and through the measured position. Correspondingly, exactly one straight line can be formed through the selected measurement point and, likewise, perpendicular to the direction of travel. The difference between the intersection point of two measured straight lines and the intersection point of the associated straight lines through the selected measurement points directly indicates the accuracy or the error of the absolute position measured by the navigation system. Such a determination of the accuracy is independent of a lateral offset of the vehicle on the test route and of the location of the receiver of the navigation system in the vehicle.

In yet another preferred embodiment of the disclosure, the determination of the accuracy of the satellite-based navigation system includes a transformation of the detected positions and directions of travel into a local Cartesian coordinate system. For example, a transformation takes place into a coordinate system having coordinate axes parallel to the north direction and the east direction and having a zero point at or in the vicinity of testing grounds having the test route. Alternatively, a transformation can also take place into a Cartesian coordinate system having coordinate axes that have been arbitrarily rotated with respect to the north direction. After such a transformation, the determination of the accuracy of the navigation system can be carried out considerably more easily by a use of linear equations and Cartesian coordinates indicated, for example, in meters, than is the case with geographical coordinates, such as length and width, for example.

A system according to the disclosure for determining the accuracy of a satellite-based navigation system for a vehicle during operation on a test route contains two or more optical devices, which are disposed at two or more selected measurement points on the test route having non-parallel directions of travel. Every optical device is designed for providing a light beam propagating along the test route essentially perpendicularly to the direction of travel. In addition, the system contains an optical triggering device that is fastened on the vehicle and is designed for detecting the light beams impacting the vehicle perpendicularly to the direction of travel during an operation on the test route and for triggering a detection of the position and the direction of travel measured by a receiver of the satellite-based navigation system, upon detection of a light beam. Furthermore, the system contains a data processing system for determining an accuracy of the satellite-based navigation system by means of the detected positions and directions of travel and by means of the position coordinates of the selected measurement points.

In a manner analogous to the corresponding method, a quickly executable and highly accurate determination of the accuracy of a satellite-based navigation system is implemented in a simple way by means of the system according to the disclosure. In one advantageous embodiment of the system, the optical triggering device is disposed on the vehicle in a plane perpendicular to the direction of travel in which the reference point measured by the receiver of the satellite-based navigation system is located. In this way, the distance of the optical triggering device from the measured reference point of the navigation system is irrelevant for an accuracy determination.

Further embodiments of the system each correspond to described embodiments of the method according to the disclosure and have corresponding features and advantages. In particular, embodiments of the system according to the disclosure are designed for carrying out one of the above-described methods.

The disclosure is described in greater detail in the following, by way of example, with reference to the drawings. In the drawings:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
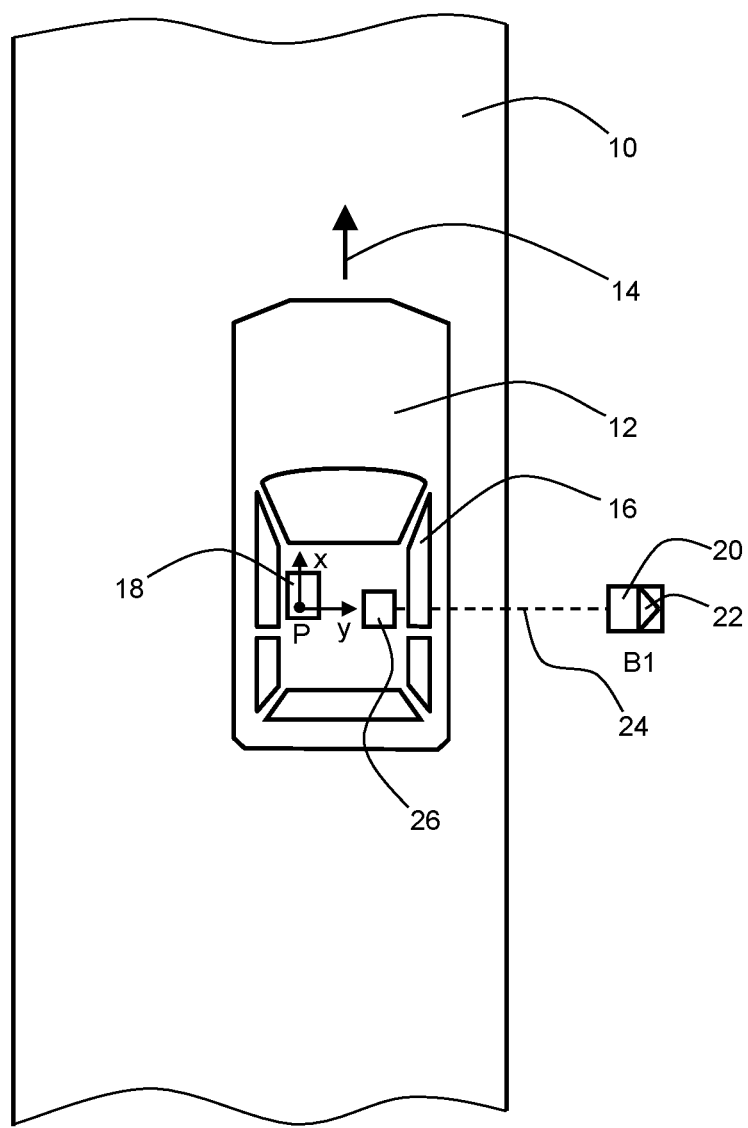
FIG. 1 shows a schematic illustration of a partial view of one exemplary embodiment of the system according to the disclosure for determining the accuracy of a satellite-based navigation system for a vehicle during operation on a test route.

FIG. 1 shows a schematic illustration of one section of a test route 10. The test route 10 is located, for example, on testing grounds for motor vehicles. A vehicle 12 moves on the section of the test route 10 in a direction of travel 14 parallel to the local direction of the test route. The vehicle 12 is shown having windows 16 in a schematic view. A receiver 18 of a highly accurate, satellite-based navigation system is fastened in or on the exterior of the vehicle 12 for test purposes. The receiver 18 continuously determines the position of a reference point P in geographical coordinates. For this purpose, the receiver 18 receives navigation signals from multiple satellites—which are not illustrated in FIG. 1—of a satellite-based navigation system, such as, for example, the known GPS (Global Positioning System) or GLONASS (GLObal NAvigation Satellite System). In addition, the receiver 18 receives correction data via further satellites, cellular telephony, or other terrestrial radio transmitters. Such correction data are offered by satellite positioning services, for example, SAPOS (satellite positioning service of the Official German Surveying and Mapping Agency) and provide for, for example, a position determination having a maximum accuracy of less than 2 cm. Since the receiver 18 is utilized for different vehicles and a test configuration for one vehicle 12 can change, a check or determination—which can be carried out rapidly and in an uncomplicated way—of the accuracy of the satellite-based navigation system is required.

For this purpose, a stationary optical device 20 is initially disposed at each of multiple selected measurement points on the edge of the test route 10. In FIG. 1, the vehicle 12 is located precisely at one selected measurement point B1 having the optical arrangement 20 set up there. In this exemplary embodiment, the optical device 20 contains a reflector 22, which is set up in such a way that a light beam emitted from the vehicle 12, perpendicular to the direction of travel 14, is reflected back to the optical device 20. The optical device 20 therefore provides a light beam 24 that is emitted along the test route 10 essentially perpendicularly to the direction of travel 14 or perpendicularly to the direction of the test route 10. A retroreflector, one or more mirrors, one or more prisms, or another suitable arrangement of optical elements is/are used, for example, as the reflector 22.

In one alternative exemplary embodiment, the optical device 20 contains a light source for providing the light beam 24. For this purpose, the optical device 20 contains, for example, a laser, one or more LEDs, or a thermal light source. In addition, a suitable energy source is provided for supplying energy to the light source, for example, a battery or a connection to the electricity supply grid. In addition, the optical device 20 can include a collimator for generating a parallel beam of light. The light source or the optical device 20 is oriented in such a way that the generated light beam propagates along the test route 10 perpendicularly to the test route 10 or perpendicularly to the direction of travel 14.

Furthermore, an optical triggering device 26 is fastened in or on the exterior of the vehicle 12. The optical triggering device 26 contains a detector for detecting the light beam 24 incoming from the stationary optical device 22, perpendicularly with respect to the direction of travel 14. During the detection of the light beam 24, the optical triggering device 26 triggers a detection of a position of the reference point P, which has been measured by the receiver 18 of the navigation system. When a detection takes place, the measured position is stored, for example, in a memory in the vehicle 12, which is not shown in FIG. 1, or is transmitted to an external memory. A radio connection can be used for this purpose, for example. In this exemplary embodiment, the optical triggering device 26 contains a light source for generating a light beam emitted perpendicularly to the direction of travel 14. A laser, one or more LEDs, or a thermal light source, for example, is/are used as the light source. In alternative embodiments, the light source can also be separate from the optical triggering device on the vehicle or, as described above, can be provided with the stationary optical device.

The optical triggering device 26 is oriented in the direction of travel 14 as accurately as possible such that said triggering device is located, together with the reference point P measured by the navigation system, in a plane perpendicular to the direction of travel 14. For the purpose of illustrating this orientation, the direction of travel x and a direction y perpendicular thereto are shown at reference point P in FIG. 1. The optical triggering device 26 and the measured reference point P both lie on a straight line defined by the y-direction. The distance between the two with respect to the x-direction is approximately equal to zero. Since the distance in the y-direction, as described in greater detail further below, is not incorporated into the determination of the accuracy, in this orientation of the optical triggering device 26, the relative distance to the receiver 18 can be disregarded in the accuracy determination of the navigation system. The orientation in the aforementioned plane takes place with an error that is at least less than a maximum accuracy of the satellite-based navigation system, i.e., for example, less than 2 cm. In one alternative exemplary embodiment, the optical triggering device 26 is disposed at a distance in the x-direction from the receiver 18. In this case, this distance with respect to the direction of travel is accurately determined and this distance is taken into account in a determination of the accuracy.

Figure 2:
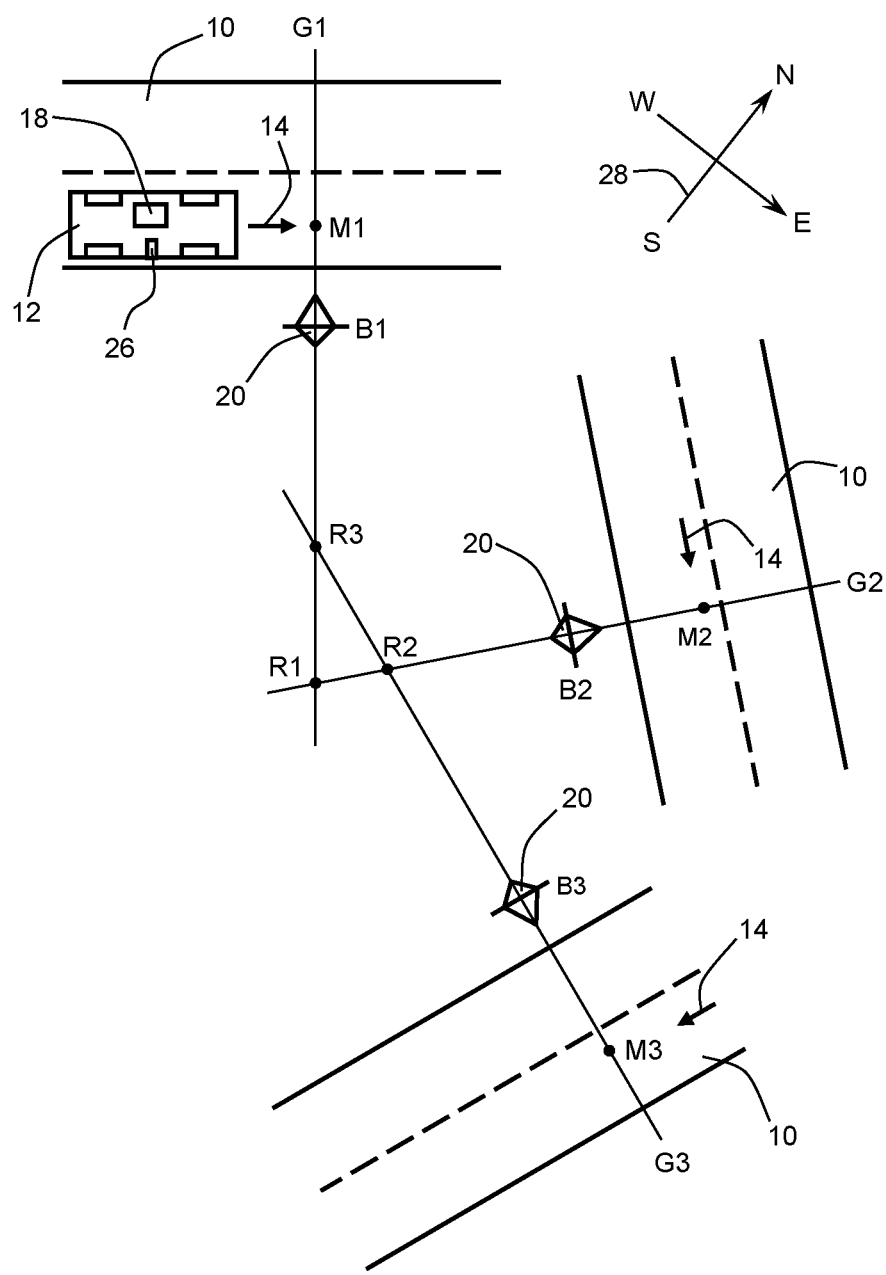
FIG. 2 shows a schematic illustration of one exemplary embodiment of the method according to the disclosure for determining the accuracy of a satellite-based navigation system together with the exemplary embodiment of the system according to FIG. 1.

FIG. 2 schematically shows one exemplary embodiment of the method according to the disclosure, together with the exemplary embodiment of the system according to the disclosure, which was already partially represented in FIG. 1. In all, three sections of the test route 10 are represented in FIG. 2, in each of which one measurement point B1, B2, B3, respectively, was selected. The measurement points B1, B2, B3 are selected under the condition that the direction of travel 14 at one measurement point B1, B2, B3 is not parallel to the direction of travel 14 at one of the other measurement points B1, B2, B3. Preferably, two measurement points B1, B2 having directions of travel 14 approximately perpendicular to each other are selected in order to minimize error. Furthermore, measurement points having an exactly known position in a geographical or local coordinate system are preferred. If a position is not known, a measurement of the measurement point is initially carried out.

At each of the selected measurement points B1, B2, B3, a stationary optical device 20, which was already described above, is disposed and oriented in such a way that a light beam is provided, which is emitted perpendicularly to the local direction of the test route 10 or perpendicularly to the direction of travel 14. In addition, a propagation of the light beam along the test route is oriented at the level of the optical triggering device 26 in the vehicle 12. Finally, the optical triggering device 26 is fastened on the vehicle 12 and is oriented as described above. The optical triggering device 26 and the three stationary optical devices 20, together with the non-illustrated memory for measured positions and a likewise non-illustrated data processing system, form a system for determining the accuracy of the satellite-based navigation system.

In order to determine the accuracy of the navigation system, the vehicle 12 travels along the test route 10. A maximum speed must not be exceeded at the measurement points B1, B2, B3. This maximum speed is predefined by the maximum accuracy of the navigation system and the number of position determinations per second. For example, at 100 position determinations per second and an accuracy of 2 cm, the speed must be less than 2 meters/second.

At the measurement point B1, the optical triggering device 26 detects the light beam 24, which has been reflected by the optical device 20, perpendicularly to the direction of travel 14, and which propagates along the straight line G1. As a result, a detection of the position of the reference point P of the receiver 18 and a detection of a measured direction of travel are triggered. Upon detection of the measured position, the reference point P is located at the point M1. This point lies on the straight line G1, which extends through the measurement point B1 and extends perpendicularly to the direction of travel. By means of the straight line G1, the position coordinate with respect to the direction of travel 14 is exactly established, while the position coordinate perpendicular thereto remains undetermined. Therefore, the lateral offset of the vehicle 12 on the test route 10 is also irrelevant for a determination of the accuracy of the navigation system. Correspondingly, when the measurement point B2 is passed, the position of the point M2 measured by the receiver 18 is detected and stored in the memory and, when the measurement point B3 is passed, the position of the point M3 measured by the receiver 18 is detected and stored in the memory.

The positions of the points M1, M2, M3 measured in geographical coordinates are initially transformed into a local Cartesian coordinate system 28. In this exemplary embodiment, the x-axis of the selected coordinate system 28 points in the east direction and the y-axis points in the north direction. Alternatively, another coordinate system, which has been arbitrarily rotated with respect to the north direction and which has a zero point, can be utilized in or with the testing grounds. The accuracy determination can be carried out more easily with the aid of a Cartesian coordinate system. In particular, meters can be used as the measure of length, and linear equations can be utilized.

For the purpose of determining the accuracy of the navigation system, an intersection point R1 of the straight line G1—which was determined by the selected measurement point B1 and the orthogonality with respect to the direction of travel 14—with the straight line G2—which was determined by the selected measurement point B2 and the orthogonality with respect to the direction of travel 14—is determined by means of the data processing system. In addition, an intersection point R1' of the straight line perpendicular to the direction of travel through the measured position at the point M1 and the straight line perpendicular to the direction of travel through the measured position at the point M2 is determined. If the measured coordinates at the points M1 and M2 match the actual coordinates at these points, the intersection points R1 and R1' match. The difference between the intersection points R1 and R1' therefore represents the accuracy or the error of the satellite-based navigation system in the determination of the positions of the points M1 and M2. Correspondingly, the accuracies of the measured positions of the points M2 and M3 through the intersection point R2 and the measured positions of the points M1 and M3 through the intersection point R3 can be determined for the purpose of error minimization. A mean of the accuracies or the greatest inaccuracy with respect to the north direction and the east direction, for example, can then be used as the accuracy of the satellite-based navigation system. The determination of the accuracy, which has been carried out in this way, is independent of the lateral offset of the vehicle 12 on the test route 10 and the position of the receiver 18 in or on the vehicle 12.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for determining accuracy of a vehicle satellite-based navigation system during operation on a test route comprising:
providing light beams propagating perpendicularly to a direction of travel of a vehicle along the test route to each of two selected measurement points on the test route, wherein the direction of travel at each of the two measurement points are not parallel;
detecting the light beams impacting the vehicle perpendicularly to the direction of travel via an optical triggering device fastened on the vehicle during operation of the vehicle on the test route;
triggering a detection of at least two positions and the direction of travel measured by a receiver of the satellite-based navigation system upon detection of a light beam by the optical triggering device;
determining an accuracy of the satellite-based navigation system based on the at least two positions, directions of travel and position coordinates of the two selected measurement points;
providing a light beam directed onto the vehicle perpendicularly to the direction of travel at three or more selected measurement points on the test route; and
disposing, at one of the selected measurement points, a light source for providing the light beam perpendicular to the direction of travel.

2. The method as claimed in claim 1, wherein the optical triggering device is disposed on the vehicle in a plane perpendicular to the direction of travel, and a reference point measured by the receiver of the satellite-based navigation system is located within the plane.

3. The method as claimed in claim 1 further comprising selecting two measurement points on the test route, each of the measurement points having directions of travel perpendicular to one another, for providing the light beams propagating along the test route perpendicularly to the corresponding direction of travel.

4. The method as claimed in claim 1 further comprising disposing, at one of the selected measurement points, a reflector for providing the light beam, perpendicular to the direction of travel, by reflection of a light beam emitted from the vehicle.

5. The method as claimed in claim 1, wherein determining the accuracy of the satellite-based navigation system includes a comparison of an intersection point of two light beams, which has been calculated from the at least two positions and direction of travel, with an intersection point of the light beams, which has been established by the selected measurement points for providing the light beams.

6. The method as claimed in claim 1, wherein determining the accuracy of the satellite-based navigation system includes a transformation of the detected positions and direction of travel into a local Cartesian coordinate system.

7. A system for determining accuracy of a satellite-based navigation system for a vehicle during operation on a test route comprising:

two or more optical devices disposed at two or more selected measurement points on the test route having non-parallel directions of travel and are each configured to provide a light beam propagating perpendicularly to a vehicle direction of travel along the test route;
an optical triggering device fastened on the vehicle configured to detect the light beams from the optical devices impacting the vehicle perpendicularly to the vehicle direction of travel on the test route, and to trigger a detection of a detected position and the vehicle direction of travel measured by a receiver of the satellite-based navigation system, upon detection of one of the light beams; and
a data processing system configured to determine an accuracy of the satellite-based navigation system based on the detected positions, directions of travel, and the position coordinates of the selected measurement points, wherein the test route includes two measurement points, each having directions of travel perpendicular to one another, to provide each light beam, via a light source disposed at each of the two measurement points, propagating along the test route perpendicularly to the direction of travel.

8. The system as claimed in claim 7, wherein the optical triggering device is disposed on the vehicle in a plane perpendicular to the direction of travel, wherein a reference point measured by the receiver of the satellite-based navigation system is located within the plane.

9. The system as claimed in claim 7 further comprising a reflector to provide the light beam, perpendicular to the direction of travel, by reflection of each of the light beams emitted from the vehicle is disposed at one of the selected measurement points.

10. The system as claimed in claim 7, wherein the accuracy of the satellite-based navigation system includes a comparison of an intersection point of each of the light beams that has been established by the measurement points.

11. A vehicle comprising:
a device to detect light beams provided from a plurality of optical devices, each disposed at a measurement point having a light source, on a route, to provide a light beam propagated perpendicularly to a vehicle travel direction along the route, and provide a vehicle direction of travel position; and
a processor configured to, in response to detection of the vehicle direction of travel position, determine an accuracy of a navigation system.

12. The vehicle as claimed in claim 11, wherein the device is disposed on the vehicle in a plane perpendicular to the vehicle direction of travel, wherein a reference point measured by a receiver of the navigation system is located within the plane.

13. The vehicle as claimed in claim 11, wherein the test route includes two measurement points, each having directions of travel being perpendicular to each other, to provide each light beam propagating along the test route perpendicularly to the direction of travel.

14. The vehicle as claimed in claim 13 wherein each of the plurality of optical devices comprises a reflector being perpendicular to the direction of travel and disposed at one of the measurement points to provide reflection of the light beams emitted from the vehicle.

15. The vehicle as claimed in claim 13, wherein the accuracy of the navigation system includes a transformation of the vehicle direction of travel position and vehicle direction of travel into a local Cartesian coordinate system.

* * * * *